United States Patent [19]

Holub et al.

[11] 4,065,972
[45] Jan. 3, 1978

[54] METHOD AND APPARATUS FOR UNDERGROUND DEPOSIT DETECTION

[75] Inventors: Fred F. Holub, Schenectady, N.Y.; H. Ward Alter, Danville, Calif.

[73] Assignee: Terradex Corporation, Walnut Creek, Calif.

[21] Appl. No.: 689,710

[22] Filed: May 24, 1976

Related U.S. Application Data

[63] Continuation of Ser. No. 545,073, Jan. 29, 1975, abandoned.

[51] Int. Cl.² .......................... G01N 1/26; G01V 9/00
[52] U.S. Cl. .......................... 73/421.5 R; 23/230 EP; 73/432 PS
[58] Field of Search .................. 73/421.5, 432 R; 23/230 EP

[56] References Cited

U.S. PATENT DOCUMENTS

| | | | |
|---|---|---|---|
| 2,266,556 | 12/1941 | Kelly | 23/230 EP |
| 2,284,147 | 5/1942 | Herrick | 73/421.5 |
| 2,312,271 | 2/1943 | Smith | 23/230 EP |
| 2,345,219 | 3/1944 | Sanderson | 73/421.5 |
| 2,348,103 | 5/1944 | Beakman | 23/230 EP |
| 2,465,564 | 3/1949 | Abrams | 23/230 |
| 3,028,313 | 4/1962 | Oberdorfer | 23/230 EP |
| 3,180,983 | 4/1965 | Hall, Jr. et al. | 23/230 EP |
| 3,862,576 | 1/1975 | Pogorski | 73/421.5 R |

FOREIGN PATENT DOCUMENTS

184,011  1966  U.S.S.R. .......................... 73/421.5 R

Primary Examiner—S. Clement Swisher
Attorney, Agent, or Firm—Townsend and Townsend

[57] ABSTRACT

A method and apparatus for collecting gas samples associated with underground minerals. A plurality of small gas sample containers are planted in an inverted position in shallow holes in the surface of the earth in a predetermined pattern, and upwardly migrating gases associated with the underground minerals being sought are collected in the containers for a predetermined time period, to obtain a time-integrated representation of the amount of one or more gases of interest migrating to the surface over that time period. Two types of containers are alternately employed: A total gas sample container in which all upwardly migrating gases are admitted into a sealed compartment at a preselected flow rate; and a specific gas sampler container in which strips of detector material which are sensitive to predetermined specific gaseous substances are mounted within the inverted container and exposed to the upwardly migrating gases over the predetermined time interval. The containers are removed from the shallow holes after the lapse of the predetermined time interval, and the detector material alone, or the containers with the detector material still mounted, are subjected to qualitative and quantitative analysis. The gas collection period is maintained substantially constant for all containers.

13 Claims, 17 Drawing Figures

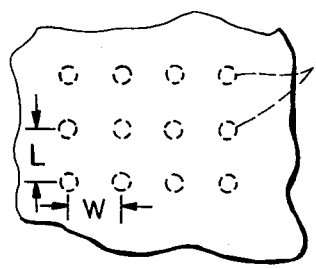
Fig_1A
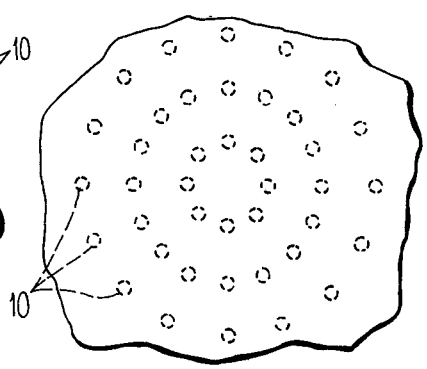
Fig_1B
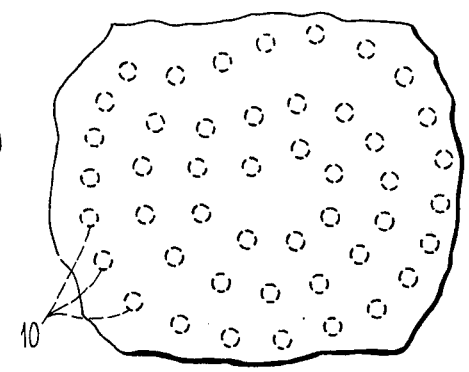
Fig_1C
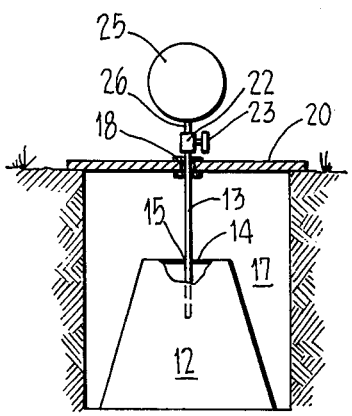
Fig_2
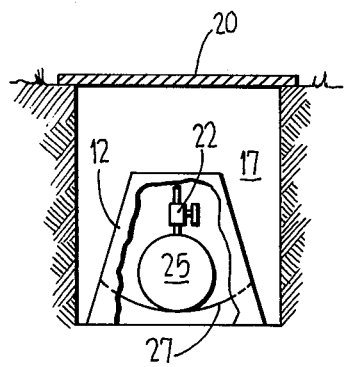
Fig_4
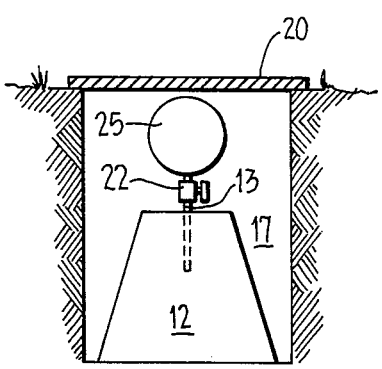
Fig_3
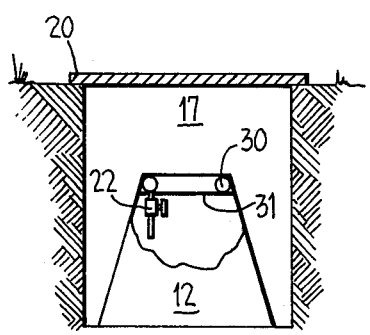
Fig_5
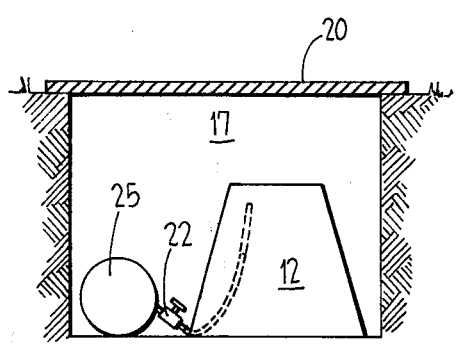
Fig_6

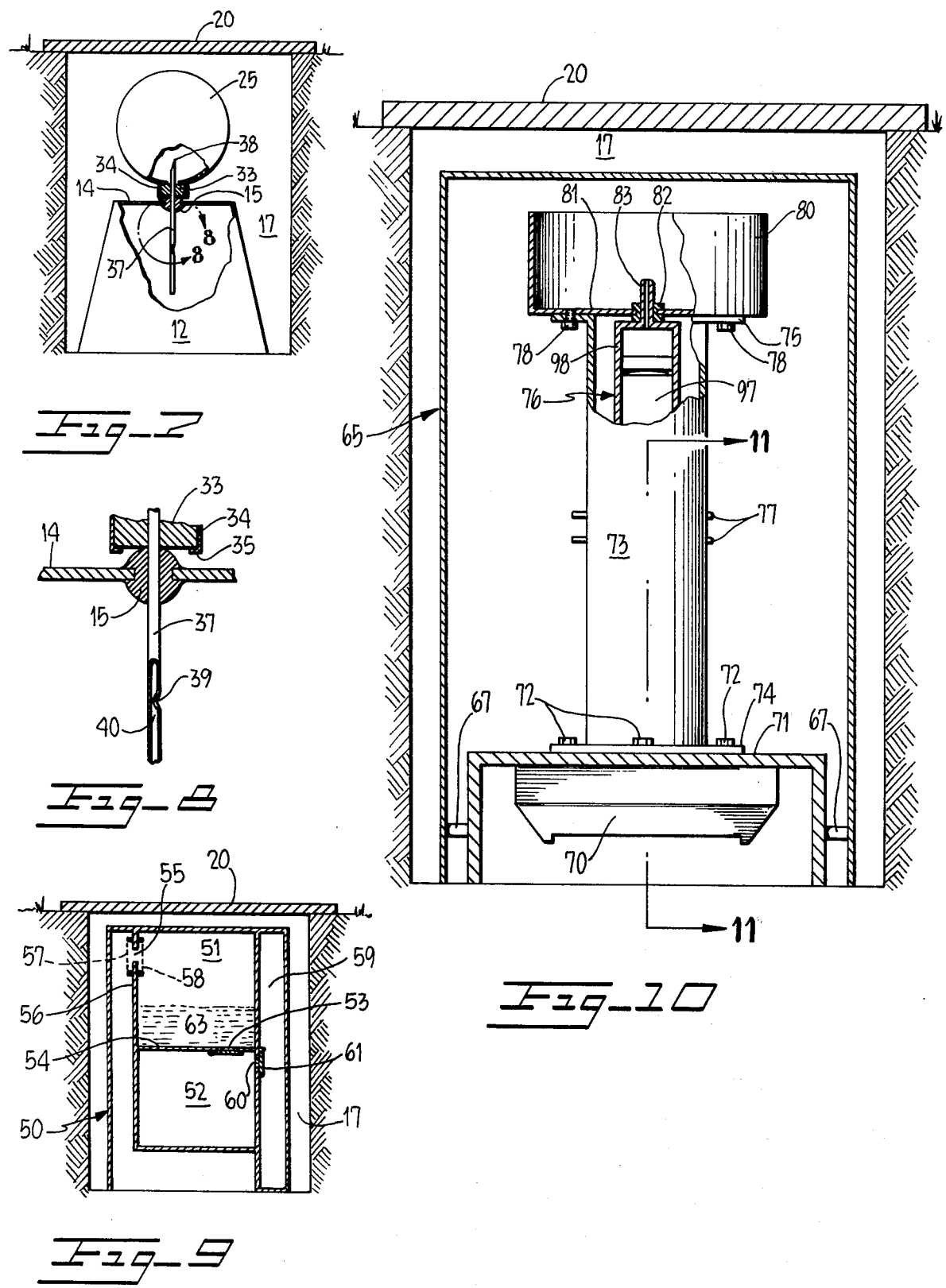

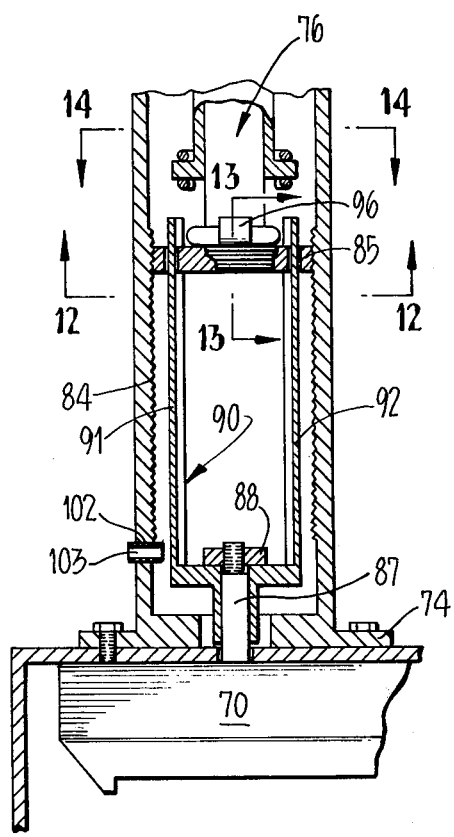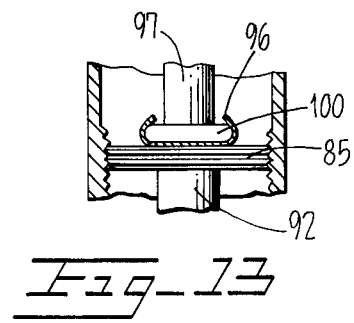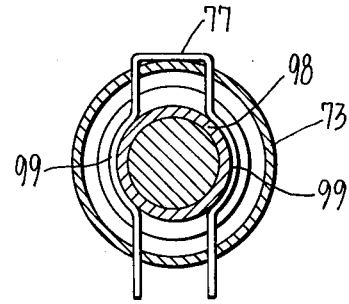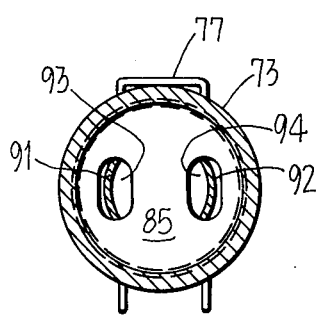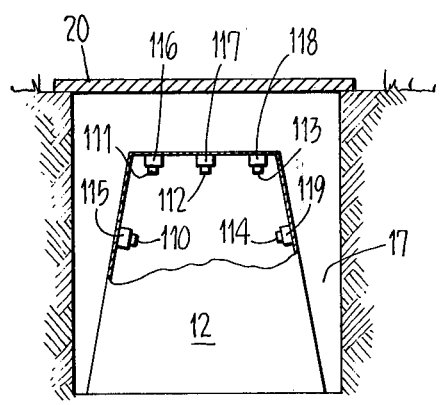

METHOD AND APPARATUS FOR UNDERGROUND DEPOSIT DETECTION

This is a continuation of application Ser. No. 545,073, filed 01/29/75, now abandoned.

BACKGROUND OF THE INVENTION

This invention relates to the field of geophysical prospecting. More particularly, this invention relates to an apparatus and method for detecting underground minerals such as oil, gas, coal, water, and other resources. As used in this disclosure, the term "underground minerals" is used to designate both inorganic substances, such as water, mercury, and uranium, and organic substances, such as petroleum, gas, and coal.

Gaseous substances associated with subterranean deposits of minerals such as oil, gas and other materials, e. g., water and mercury, are known to migrate upwardly towards the earth's surface. In the past, efforts have been made to sample those gases reaching the earth's surface, analyze the samples collected, and generate qualitative data in order to locate promising deposits. The following U.S. Patents disclose several devices and methods contrived in the past for this purpose:

1,843,879; 2,823,984
2,112,845; 3,084,553
2,284,147; 3,239,311
2,345,219; 3,490,288
2,736,638; 3,594,583

In spite of the many efforts to collect and generate meaningful data providing a significant correlation between sampled gases and commercially exploitable underground minerals, to date no reliable scheme has been successfully implemented on a commercial scale utilizing this gas sampling technique. The results of a recent effort, for example, reported in the *Geological Survey of Canada,* Paper 73-1, Part B, entitled, "A Preliminary Evaluation of the Applicability of the Helium Survey Technique to Prospecting for Petroleum", to gather significant data in this field demonstrates that current techniques at best provide only marginally useful information.

It is now known that the concentration in the surface soil of gases whose origins are deep varies greatly with time at any one location. Instantaneous sampling techniques, and sampling techniques utilizing relatively short intervals, therefore do not yield accurate information relating to the concentration of such gases. As a result, exploration activities directed to locating promising underground oil, gas, and other minerals have concentrated on other techniques, such as seismic surveying with acoustic waves, electrical and nuclear well logging, test bore drilling, and the like. While such efforts have yieldeduseful results in the past, the growing scarcity of rich depositsand the increasing expense of conducting such exploratory activities have rendered these techniques relatively undesirable.

SUMMARY OF THE INVENTION

The invention comprises a method and apparatus for collecting gas samples associated with subterranean deposits of a wide variety of underground minerals, such as petroleum, gas, coal, water, mercury, and the like, which yield highly accurate information relating to the existence of such underground deposits, and which can be implemented in an extremely inexpensive manner. The method proceeds by planting small gas sample containers in an inverted position in shallow holes in the surface of the earth in a predetermined pattern and collecting gases therein for a predetermined time period in order to obtain a time-integrated representation of the amount of one or more gases of interest migrating to the surface over that time period. In a first type of container, hereinafter termed a total gas sampler container, all gases migrating upwardly into each container are admitted into a sealed compartment at a preselected flow rate. The gases collected in each container over the predetermined collection interval are then analyzed in the field or at a remote laboratory by conventional mass spectrographic or gas chromatographic techniques to obtain the relative concentration of specific gases of interest to the total volume of gas collected. This information is then interpreted to identify potentially valuable deposits of petroleum, gas, or other substances of interest. In a second type of container, hereinafter termed a specific gas sampler container, strips of detector material which are sensitive to predetermined specific gaseous substances associated with underground minerals of interest are mounted within the inverted container and exposed to the upwardly migrating gases over the predetermined time interval to obtain a time-integrated parameter representative of the concentration of the substance of interest. The containers are removed from the shallow holes after the lapse of the time interval, and the detector material alone, or the containers with the detector material still mounted, are taken to the laboratory for qualitative and quantitative analysis.

When surveying with either type of container, each individual container is provided with an identification code which is correlated with the geographical coordinates of the hole and the planting time to ensure substantially uniform gas collection periods and to enable correlation of the analytical laboratory results with the individual container locations.

Several embodiments of the total gas sampler type container are disclosed, each of which includes a discrete sampling tank in fluid communication with the interior of the inverted planted cup container through a metering device which may comprise a fixed or adjustable metering valve, a capillary tube crimped to provide a restricted central flow orifice, or other devices capable of admitting gas to the sampling tank at the desired predetermined flow rate; and means for drawing the gas into the tank, such as a small hypodermic syringe operated by a battery powered clock mechanism, an evacuated vessel, a liquid displacement auxiliary tank, or the like. Several embodiments of the specific gas sampler type container are desclosed, in each of which one or more strip detector materials are secured to the inner walls of the container.

For a fuller understanding of the nature and advantages of the invention, reference should be had to the ensuing detailed description taken in conjunction with the accompanying drawings.

BRIEF DESCRIPTION OF THE DRAWINGS

FIG. 1A is a perspective view of the earth's surface showing the manner of deploying the gas sampling containers in a first predetermined pattern; FIGS. 1B and 1C are schematic aerial views of the earth's surface showing the gas sampling containers deployed in alternate patterns;

FIGS. 2–7 are side elevational views partially broken away illustrating several embodiments of total gas sampler containers in situ;

FIG. 8 is an enlarged detail view of the FIG. 7 embodiment;

FIG. 9 is a side sectional view illustrating an alternate embodiment of a total gas sampler type container in situ;

FIG. 10 is a side elevational view partially broken away of another embodiment of a total gas sampler container in situ;

FIG. 11 is a sectional view taken along lines 11—11 of FIG. 10;

FIG. 12 is a sectional view taken along lines 12—12 of FIG. 11;

FIG. 13 is a sectional view taken along lines 13—13 of FIG. 11;

FIG. 14 is a sectional view taken along lines 14—14 of FIG. 11; and

FIG. 15 is a side elevational view partially in section illustrating an embodiment of a specific gas sampler container.

DESCRIPTION OF THE PREFERRED EMBODIMENTS

Turning now to the drawings, FIG. 1 is a schematic perspective view illustrating the manner in which containers constructed according to the invention are deployed in the field for surveying purposes. As shown in this Fig., a plurality of containers designated by reference numeral 10 are planted in the earth's surface to a predetermined depth, preferably in a range from about one to about five feet, below the surface of the earth and mutually spaced by predetermined distances L, W to form a predetermined pattern. The pattern may be a rectangular grid pattern as shown in FIG. 1A, a plurality of concentric circles as illustrated in FIG. 1B, or a plurality of irregularly shaped contours, such as the contour lines on a topographical map as shown in FIG. 1C, depending on the terrain being surveyed, the type of mathematical correlation desired and other known factors.

FIG. 2 illustrates a first embodiment of a total gas sampler type container. A small frusto-conical cup 12, such as a plastic cup, fitted with a hollow tube 13 inserted through an aperture in the base of 14 of cup 12 is mounted in a bore hole 17 in an inverted attitude. A seal 15, fabricated from neoprene, rubber, or other equivalent material provides a hermetic seal between the outer walls of conduit 13 and base 14 or cup 12 in order to prevent water from entering the cup. Conduit 13 extends upwardly from container 12 through an apertured bushing 18 mounted in a bore hole cover plate 20 and is received in a first end of a suitable metering valve 22. As depicted, metering valve 22 is provided with a manually operable adjustment knob 23 in order to permit adjustment of the metering orifice contained therein and thus the flow rate of gas therethrough. However, if desired, metering valve 22 may be preadjusted to provide the desired flow rate and knob 23 omitted. The outlet end of metering valve 23 is coupled to an evacuated collecting tank 25 via a suitable conduit 26, which is preferably integrally formed therewith.

In use, after bore hole 17 has been made in the earth's surface, container 12 and conduit 13 attached thereto are placed therein the inverted position shown, cover plate 20 is installed and valve 22 with tank 25 attached thereto are secured to the upper end of conduit 13. Valve 22 is then adjusted to provide the desired flow rate along the fluid path from the volume enclosed by container 12 along conduit 13 to container 25. If desired, bore hole 17 may be filled with loose soil, rock, or the like to provide a packing for container 12. The individual containers 12 are left in their respective bore holes 17 for a predetermined collection period. After the collection period has lapsed, valve 22 is closed and detached from the upper end of conduit 13 with tank 25 secured thereto. The gas collected over the collection period may then be removed in the field by a suitable conventional evacuation pump or, alternatively, the tank 25 and valve 22 assembly itself may be removed to a remote laboratory facility at which the gas may be analyzed using known mass spectrographic or gas chromatographic techniques.

FIGS. 3–8 illustrate alternate embodiments of the total gas sampler type of container. In FIG. 3, the length of conduit 13 has been shortened in order that valve 22 and tank 25 may be accomodated within the bore hole 17, with these latter two elements mounted externally of cup 12. In FIG. 4, valve 22 and tank 25 are suspended within cup 12 by a conventional mechanical support generally indicated by reference numeral 27. In FIG. 5, a toroidal tank 30 is mounted within the volume enclosed by cup 12 by means of a mechanical support 31 with valve 22 secured thereto. In FIG. 6, tank 25 and valve 22 are disposed within bore hole 17 externally of cup 12 with inlet conduit 13 extending into the volume enclosed by cup 12 and terminating in an upper portion of this volume.

In the FIG. 7 embodiment, tank 25 is provided with a septum 33 at the fluid inlet thereof, septum 33 being held in place by a collar 34 having an inwardly extending peripheral flange 35. A conduit 37 mounted in base wall 14 of cup 12 is provided with a pointed tip 38 and, as best shown in FIG. 8, a crimped portion 39, for restricting the flow of gasses along the path defined by hollow interior 40 thereof. In use, tank 25 is first evacuated by inserting a probe similar to conduit 37 through septum 33 and evacuating the interior thereof by means of a conventional vacuum pump, after which the probe is withdrawn. This may be done in advance of cup implantation or at the site. To activate, tank 25 is mounted onto the base of cup 12 by inserting tip 38 of probe 37 through septem 33.

This may be done before or after cup implantation, as desired. After the collection period has lapsed, tank 25 may be readily removed by separating cup 12 therefrom. The gas collected in the interior of tank 25 may thereafter the withdrawn for analysis in the manner noted above.

FIG. 9 illustrates another embodiment of a total gas sampler type container in which an open-mouthed inverted container 50 is constructed with inner wall structure providing first and second enclosed chambers generally designated with reference numerals 51, 52. Chamber 52 is preferably initially evacuated, and chambers 51, 52 are fluid intercoupled by means of a metering orifice 53 formed in intermediate wall partition 54. An inlet orifice 55 is formed in wall portion 56 for permitting gas collected within the interior of container 50 to flow into chamber 51. Mounted adjacent inlet orifice 55 is a membrane 57 preferably fabricated from dimethyl siloxane polymer or porous polytetrafluoreothylene which functions to prevent the passage of dirt, dust, sand or other contaminate material towards inlet orifice 55. An auxiliary chamber 59 is also provided which is in fluid communication with chamber 52 via outlet orifice 60 and a suitable one-way valve 61 for permitting the flow of fluid from chamber 52 to chamber 59 for the purpose described below.

In use, chamber 51 is initially filled with a heavy fluid 63 such as mercury, water, perfluoro-carbon oil, silicone oil, or other suitable fluid which is non-reactive with the gasses to be collected and subsequently analyzed, and chamber 52 is evacuated in any convenient fashion. With container 50 mounted in bore hole 17, metering orifice 53 permits fluid 63 to flow into chamber 52 at a predetermined rate. As the level of fluid 68 in chamber 51 drops, the partial vacuum created thereby draws the gas collected in container 50 into chamber 51 through membrane 57 and inlet orifice 55. The ingress of collected gas continues until the supply of fluid 63 is exhausted from chamber 51. It is noted that the volumetric dimensions of chambers 51, 52 and the flow rate provided by metering orifice 53 should be preselected so that the predetermined gas collection period lapses before the supply of fluid 63 is exhausted from chamber 51.

In some applications, it may be desirable to operate the FIG. 9 embodiment without first completely evacuating chamber 52. In this event, any fluid initially contained within chamber 52 and displaced by entering fluid 63 is conducted to auxiliary chamber 59 via outlet orifice 60 and oneway valve 61. After the gas collection period lapses container 50 is removed from bore hole 17 and the collected gas within chamber 51 is withdrawn and later analyzed in the manner noted above.

FIGS. 10–13 illustrate an alternate embodiment of a total gas sampler type of container 65 employing a syringe driven by a battery operated electrical clock mechanism. With reference to FIG. 10 an external open-mouthed housing 66 positioned in bore hole 17 in an inverted attitude contains a battery powered electrical clock mechanism 70 mounted in a base member 71, member 71 being secured to housing 66 by arms 67. Secured to the upper surface of base member 71 by means of capscrews 72 is a substantially cylindrical housing member 73 having flanged end portions 74, 75. Electrical clock mechanism 70 may comprise of anyone of a number of known such mechanisms, such as a General Electric Model XC68 X134 clock motor. A conventional hypodermic syringe 76, partially visible in FIG. 10, is secured within the interior of housing 73 by means of a pair of pin fasteners 77 in the manner described below. Secured to the upper end of housing 73 by means of capscrews 78 is an open-mouthed substantially cylindrical cuplike member 80 having a bottom wall 81. Bottom wall 81 has a central aperture provided with a seal 82 through which the apertured tip 83 of syringe 76 extends to enable ingress of gas accumulating in the interior of member 80 to the interior of syringe 76.

With reference to FIG. 11, the interior of housing member 73 is internally threaded along a lower portion 84 thereof, and an externally threaded follower nut 85 is threadably engaged therein. Attached to the output shaft 87 of clock mechanism 70 by means of a nut 88 is a rotatable spider member 90 having a pair of upwardly extending arms 91, 92. As best shown in FIG. 12, arms 91, 92 are received in a pair of oppositely arranged apertures 93, 94 of follower nut 85 so that rotation of spider member 90 is transmitted to follower nut 85.

Secured to the upper surface of follower nut 85 by means of a mounting clip 96 is the translatable inner element 97 of syringe 76. The stationary outer element 98 is maintained in a relatively fixed attitude relative to inner element 97 by means of a pair of conventional retaining clips 77 each comprising a generally U shaped member having a pair of arms with a curved intermediate portion 99 for embracing the outer wall surface of outer element 98 above and below, respectively, lower flange member 100, each pin being received in two pairs of oppositely disposed apertures formed in housing member 73.

In order to provide a limit stop for follower nut 85 in the downward direction, housing member 73 is provided with a threaded transverse bore 102 and an externally threaded limit stop member 103 having an inner end which extends radially inwardly a sufficient distance to prove abutting contact with the lower surface of follower nut 85 when the latter element has reached the desired lower limit of travel.

In operation, with nut 85 initially positioned adjacent the upper limit of threaded portion 84, output shaft 87 is rotated by clock mechanism 70. This movement is transmitted via arms 91, 92 to follower nut 85 causing nut 85 to be translated in the downward axial direction of housing member 73. As follower nut 85 is rotated and translated, inner syringe element 97 follows the motion of nut 85 resulting in the gradual withdrawal of inner syringe element 97 from outer syringe element 98. The gradual withdrawal of inner element 97 draws the gases accummulating in inlet member 80 through the tip 83 of syringe 76 and into the collecting chamber therein. This operation continues until the clock mechanism is deactivated, or limit stop member 103 engages nut 85. If desired, member 103 may be replaced by a normally closed electrical limit switch connected in series with the electrical power supply to clock mechanism 70, with the moveable switch element positioned in the interior of housing 73 so that the switch is opened when nut 85 reaches the lower travel limit. Other equivalent arrangements will occur to those skilled in the art.

The traveling rate of follower nut 85 and inner syringe element 87, and thus the sample accumulation rate, is a function of the speed of clock mechanism output shaft 87 and the pitch of the threads internal to housing member 73. Thus, any desired sample rate can be preselected by varying the above two parameters. In the preferred embodiment, the threads internal to housing member 73 and the external threading of follower nut 85 are chosen to be 1⅛–20 in order to provide a total translational travel of 2 inches axially over a 20-day period with the above-described clock mechanism. This may be varied and tailored to the requirements of any given application.

It should be understood that the total gas samplers shown in FIGS. 2–14 are illustrative only and that many other types of devices may be substituted for the structure shown. For example, rather than employing a sample chamber having a rigid structure such as tanks 25, 30 and 40, other types of sample chambers may be used. Examples of such chambers are a bellows made of spring material or plastic bellows with a bias spring included therein, an elastic balloon, an inelastic bag, or a rubber bulb. Further, in addition to using the vacuum in a sample chamber as the motive means for drawing in the gasses to be sampled, other arrangements may be employed for this purpose. Examples of alternate arrangements are a miniature pump either mounted externally of the sample chamber or integrally formed therewith and powered by a vacuum source, a source of electricity, a hydralic source, a spring wound mechanism or a gravity weight. Also, in addition to controlling the gas sampling rate by means of gas leak into a vacuum chamber, such as shown in the embodiments in FIGS. 2-8, by a controlled flow of liquid from the sampling chamber as shown in FIG. 9 or by a syringe driven by the clock mechanism as shown in FIGS. 10-14, other mechanisms may be employed for this purpose. Examples of such mechanisms are a small mechanical motor, an escapement clock or a pendulum, each of which can be employed in a conventional manner to expand a bellows or other expandable chamber at a controlled rate during sampling period.

FIG. 15 illustrates an embodiment of a specific gas sampler type of container. With reference to FIG. 15, cup 12 is provided with a plurality of specific gas detectors 110-114 secured to the inner wall surfaces of cup 12 by means of suitable mounting member 115-119, respectively. The choice of individual specific gas detectors 110-114 depends upon the specific gasses desired to be detected over the collection period. Many such types of detectors are known to those skilled in the art, among which the following are exemplary:

| GAS | DETECTOR | INDICATING PARAMETER |
|---|---|---|
| Mercury | Silver gauze | Quantity of absorbed mercury |
| Mercury | Selenium sulphide moistened fabric | Color Hue |
| $NH_3$ | Litmus-moistened fabric | Color Hue |
| $H_2S$ | Lead acetate moistened fabric | Color Hue |
| $SO_2/SO_3$ | Immobolized liquid base | Quantity of molecular absorption |
| Hydrocarbons | Activated surfaces and adsorbents | Quantity of molecular adsorbtion |
| $H_2O$ | Dessicants (e.g., silica gel) | Quantity of molecular absorption |

Techniques for analyzing the various indicating parameters noted above are well known to those skilled in the art. For example, in the case of the silver gauze detector for mercury, the exposed silver gauze may be analyzed by conducting a conventional atomic absorption analysis, while a selenium sulphide moistened fabric type detector may be analyzed in a conventional colorimeter. Likewise, the specific detectors for ammonia and hydrogen sulphide may be analyzed in a colorimeter. The immobilized liquid base detector for $SO_2$/$SO_3$ may be analyzed using conventional chemical analytical techniques. The activated surfaces and adsorbents used as specific detectors for hydrocarbons may be analyzed using gas chromatographic and mass spectrographic techniques. Lastly, dessicants such as silica gel used to detect water vapor may be subjected to conventional laboratory analysis.

In all embodiments of the invention, a network of containers are installed each in a different shallow bore hole in the surface of the earth at predetermined mutually spaced locations. The exact location of each container is recorded and correlated to the individual containers by any suitable coding system. After the containers have been left in situ for the predetermined collection or sampling period, they are removed from their respective locations in the earth and the collected gas or the exposed detector strips are subjected to suitable qualitative or quantitative analysis in accordance with any one of a number of known techniques. In all cases, it has been found that a time integrated representation of each particular gas of interest is obtained by closely controlling the duration of the exposure or collection period. It should be noted that the duration of the exposure or collection period may vary from survey to survey within range from about one week to about two months, the duration of the period being dependent upon a number of factors including the total number of individual containers employed in a particular survey, the mutual spacing of the containers, and the speed with which the individual containers may be installed in the earth, and removed from the earth. In any event the collection period should be long compared to the period of the time-varying signal of gas evolved from the earth. It is important to note that care should be exercised to ensure that the length of the collection period is substantially identical for each collector in a given survey.

As will now be apparent, the invention provides a simple and inexpensive technique for obtaining extremely valuable and reliable information regarding the existence of underlying deposits of a wide variety of oil, gas, coal and mineral resources. Surveys may be conducted according to the invention on a relatively wide scale and in relatively inaccessible areas quickly and economically since no heavy equipment is required and since no special technical expertise is required to plant the containers. In this connection, it should be noted that each container may be planted in a shallow hole which may be made with a small shovel or an entrenching tool or the like. It is further noted that the invention is extremely flexible in that it may be specially adapted to the type of underground mineral being sought by simply selecting specific gas detectors which are only sensitive to those gasses associated with the underground mineral. As will be further evident to those skilled in the art, the method of surveying provided by the invention requires no permanent installation of unsightly equipment and leaves no permanent scars on the landscape so that the natural state of the environment is left undisturbed once a survey is complete.

While the above provides a full and complete disclosure of the preferred embodiments of the invention, various modification, alternate constructions and equivalents may be employed without departing from the true spirit and scope of the invention. Therefore, the above description and illustrations should not be construed as limiting the scope of the invention, which is defined by the claims.

What is claimed is:

1. A method of geophysical prospecting for underground minerals having specific gases associated thereto, said gases normally migrating to the surface of the earth, said method comprising the steps of:
   a. Forming a plurality of shallow holes in the surface of the earth arranged in a predetermined pattern;
   b. Planting a plurality of gas sample containers in said holes, each container having an inlet adjacent the bottom portion thereof and each container including a gas collection chamber having a second inlet in communication with the interior of said container and means for admitting said gases into said chamber at a predetermined flow rate;
   c. Retaining said containers in said holes for a predetermined time period to enable said chamber to collect a time integrated sample of said gases migrating into said container through said inlet over said time period; and d. Removing said containers from said holes after said predetermined time period has elapsed for subsequent analysis of said time integrated sample.

2. The method of claim 1 wherein said predetermined pattern is a rectangular grid.

3. The method of claim 1 wherein said predetermined pattern is a plurality of irregular curves.

4. The method of claim 1 wherein said predetermined pattern comprises a plurality of concentric circles 5. For use in a method of geophysical prospecting for underground minerals having specific gases associated thereto, said gases normally migrating to the surface of the earth; a gas sample container adapted to be planted in a shallow hole in the surface of the earth, said gas sample container including an inlet adjacent the bottom portion thereof and means for obtaining a time integrated parameter representative of said gases migrating thereinto through said inlet over a predetermined time period, said means for obtaining a time integrated parameter including a gas collection chamber having a second inlet in communication with the interior of said container, and means for admitting said gases into said chamber at a predetermined flow rate.

6. The combination of claim 5 wherein said admitting means comprises metering means coupled to said second inlet and means for drawing said gasses through said metering means at said predetermined rate.

7. The combination of claim 6 wherein said drawing means comprises a vacuum provided within said chamber.

8. The combination of claim 6 wherein said drawing means comprises a fluid and an outlet metering orifice provided in said chamber for permitting said fluid to exit therefrom at a controlled rate.

9. The combination of claim 6 wherein said metering means comprises a tubular conduit coupled to said second inlet and including a metering valve.

10. The combination of claim 6 wherein said metering means comprises a tubular conduit coupled to said second inlet and having a restricted axial bore.

11. The combination of claim 6 wherein said gas sample container includes a base member, an internal housing member mounted on said member and having a hollow interior, and a syringe having an outer member secured to said housing member and located in the interior thereof and an inner syringe member relatively movable with respect to said outer member, said outer syringe member having a projecting tip portion with longitudinal bore for providing said metering means, said inner and outer syringe members providing said gas collection chamber; and wherein said drawing means includes means for withdrawing said inner syringe member from said outer syringe member at a controlled rate.

12. The combination of claim 11 wherein said internal housing member is internally threaded, and said withdrawing means includes a rotatable externally threaded member located in the interior of said internal housing means and threadably engaged therewith, said rotatable member being secured to said inner syringe member, and means for rotating said rotatable member.

13. The combination of claim 12 wherein said rotating means includes an output shaft, means for rotating said output shaft at a predetermined speed, and coupling means for mechanically transfering rotary motion of said output shaft to said rotatable member.

* * * * *